INVENTOR.
ABRAHAM HAREL
BY John V. Regan
Attorney

DATA STORAGE SYSTEMS

Filed Nov. 14, 1962 2 Sheets-Sheet 2

INVENTOR.
ABRAHAM HAREL
BY John V. Regan
Attorney

United States Patent Office 3,263,214
Patented July 26, 1966

3,263,214
DATA STORAGE SYSTEMS

Abraham Harel, Trenton, N.J., assignor to Radio Corporation of America, a corporation of Delaware
Filed Nov. 14, 1962, Ser. No. 237,578
9 Claims. (Cl. 340—146.1)

This invention relates to data storage systems, and more particularly to recording and retrieval methods and circuits for use in such systems.

At present there are a variety of methods of recording binary coded information in storage mediums. One such method is phase modulation recording. In this type of recording, two recording pulses of opposite phase are utilized to record each binary bit and the information is retained in the storage medium by the polarization thereof. Thus, a binary "1" is recorded by applying a first recording pulse to polarize the storage medium in one direction and a second recording pulse to polarize the storage medium in the opposite direction. Similarly, a binary "0" is recorded by doing the reverse of this i.e., by applying a first recording pulse to polarize the storage medium in the said opposite direction and then applying a second recording pulse to polarize the storage medium in the said one direction. With this type of recording, each bit cell in the storage medium is polarized in two opposite directions with a cross-over or change in the direction of polarization occurring at the approximate center of the bit cell.

One significant advantage of phase modulation recording is that binary information may be packed very densely in the storage medium without obliterating the distinctions between the difference information bits in the playback signal. This is because the transition or cross-over in the polarization of each bit cell produces a clearly definable playback signal pulse for each bit cell even at very high packing densities, which pulse is conveniently amplified by a narrow-frequency-band amplifier. The polarity of the pulses in the playback signal corersponds to the different changes in the directions of polarization.

However, a significant disadvantage in phase modulation recording is that undesirable pulses are also produced in the playback signal, in addition to the desired information carrying pulses. The undesirable pulses are produced in the playback signal whenever a succession of either binary "ones" or binary "zeros" are recorded in the storage medium. This is because the recording signal must return to its initial polarity at the end of each information bit in order to record another identical bit. Such a return causes a change in the direction of polarization of the storage medium at the boundaries of the bit cells and inevitably produces undesirable pulses in the playback signal. As a consequence of the ambiguities that could result from such a playback signal, a synchronized strobing signal is applied to gate the desired pulses through and block the undesired pulses. Such a synchronizing signal makes the read circuits complex and expensive. Additionally such a synchronizing signal tends to become unreliable as packing density increases.

Accordingly, it is an object of this invention to provide an improved retrieval circuit for a storage medium in which information is recorded by phase modulated signals.

It is another object of this invention to provide a read circuit for a storage medium in which information is recorded by phase modulated signals which does not require a synchronized strobing signal to reproduce the recorded data accurately.

In accordance with the invention, the data stored in a polarizable storage medium by phase modulated signals is reproduced without the use of a synchronized strobing signal by taking advantage of the fact that a significant change occurs in the levels of the peak amplitudes in a playback signal generated from such a storage medium. The signal level of those peaks in such a playback signal that correspond to the first bit in a group of bits of the same binary value is greater than both the signal level of the peaks which correspond to the other bits within the group as well as the signal level of the undesired pulses produced. Additionally, the polarity of the peaks of the greater amplitudes is indicative of the binary value of all of the bits in the group.

A threshold peak detector is utilized to separate the greater from the lesser peaks in the playback signal and the bipolar pulses resulting therefrom are amplified by a pulse amplifier. Means including a bistable circuit and a train of clock pulses are utilized to convert the bipolar pulses into a binary form which reproduces the initial recorded data.

Since the retrieval method in accordance with the invention is one of group rather than bit detection, an error which occurs would tend to make the total number of groups incorrect. Normal parity bit checking might or might not detect the error depending on the number of bits in an incorrect group. Thus this type of checking might not be sufficiently accurate.

Accordingly, it is still a further object of this invention to provide a group parity checking system which is particularly useful in any data retrieval method which reads by groups rather than by individual bits.

In accordance with this feature of the invention, the number of groups of binary "ones" and "zeros" are counted during the recording of the input data and group parity checking bits are added to the data stored. An error detection network is included in the read circuit to insure the detection of group errors which may occur.

The novel features that are considered to be characteristic of this invention are set forth with particularity in the appended claims. The invention, itself, however, both as to its organization and method of operation as well as to additional objects and advantages thereof, will best be understood from the following description when read in conjunction with the accompanying drawings, in which:

Figure 1:
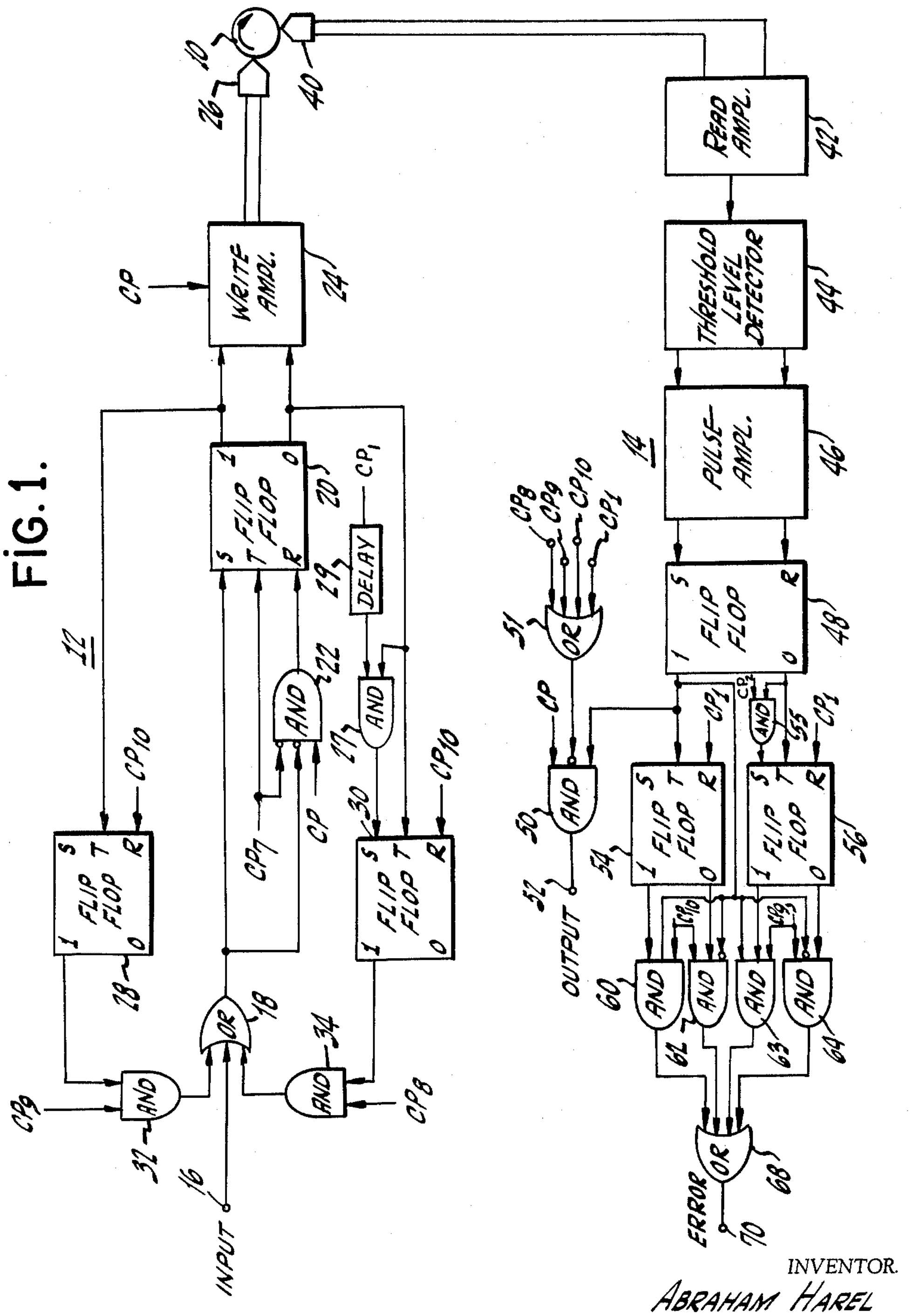
FIGURE 1 is a schematic block diagram of one embodiment of a storage system in accordance with the invention.

Referring now to FIGURE 1, one exemplification of a storage system embodying the invention is shown. The storage system includes a storage medium 10 in which data is recorded by the polarization of the storage medium. In the embodiment shown and to be described, the storage medium 10 in the system may comprise a magnetically polarizable medium which may be carried by a disc, drum, tape or the like. However it is to be noted that certain principles of the invention also apply to any polarizable storage medium including the dielectrically polarizable storage mediums such as ferroelectrics of the barium titanate type or other types, and whether scanned through mechanical motion or by other means such as electronic, optic and the like.

The storage system includes a network 12 for recording binary data in the storage medium 10 and a network 14 for retrieving the stored data. Data to be stored may be of the binary form in which a binary "one" is represented by the presence of a pulse of one polarity and a binary "zero" is represented by the absence of a pulse. It is assumed in the description to follow that the end of a word to be stored is followed by an interval of no signal input before another word is begun.

Data to be stored in the medium 10 is coupled through an input terminal 16 of the write network 12 to one input of an OR gate 18. The output of the OR gate 18 is coupled to the Set terminals of a triggerable bistable flip-flop circuit 20, as well as to an inhibit terminal of an AND gate 22. Successive trains of clock pulses (CP) from a clock pulse generator (not shown) is also applied to an input terminal of the AND gate 22 while a particular clock pulse ($CP_7$) of each train is applied to the second inhibit terminal of the gate 22. The inhibit terminals of the gate 22, which are represented by the small circles on the gate in the drawing, indicate that the AND gate 22 is disabled if inputs are applied to these terminals. Thus the gate 22 functions as a coincidence gate and produces an output only under the following coincidental conditions (1) the absence of an output from the OR gate 18, (2) the absence of clock pulse $CP_7$ and (3) the presence of any other clock pulse in the clock pulse train CP. The output of the AND gate 22 is coupled to the reset terminal R of the flip-flop 20. The flip-flop 20 is a bistable circuit which produces a continuous output of the "one" polarity from its "1" output terminal after a momentary input pulse applied to the Set terminal S causes it to operate in one of its two stable states. Simultaneously the flip-flop 20 produces a continuous output of the "zero" polarity from its "0" output terminal. Similarly a continuous output of the "one" polarity from the "0" output terminal is produced after an input pulse applied to the Reset terminal R causes it to switch to operation in its other stable state. Simultaneously the flip-flop 20 produces a continuous output of the "zero" polarity from its "1" output terminal. Additionally, an input pulse applied to the trigger input terminal T causes the flip-flop 20 to switch from the stable state in which it is operating to the other stable state. Both the "1" and "0" output terminals of the flip-flop 20 are coupled to the input terminals of a write amplifier 24 which is also fed by the train of clock pulses (CP). The combination of the flip-flop 20, and AND gate 22, and the train of clock pulses (CP) effectively converts the unipolar input signal, which consists of pulses each occupying a fraction of a clock period into a bipolar signal at the write amplifier 24, which signal consists of pulses each occupying one or more complete clock periods. The write amplifier 24 is coupled to a writing head or magnetic transducer 26 which magnetically polarizes selected surface areas of the storage medium 10 in accordance with the recording signal waveform produced by the write amplifier. The write amplifier 24 is of the type capable of providing phase modulated signals and may be similar, for instance, to that disclosed in the article "Universal High-Speed Digital Computers—A Magnetic Drum Store," Proceedings of the Institution of Electrical Engineers, April 1952 (vol. 99, part II, p. 94).

The "1" output terminal of the flip-flop 20 is also coupled to the trigger input terminal T of the bistable flip-flop circuit 28, while the "0" output terminal of the flip-flop 20 is coupled to the trigger input terminal T of the flip-flop 30. A clock pulse $CP_{10}$, which functions as the end of the word pulse, is applied to the reset terminal R of the flip-flops 28 and 30. The "0" output terminal of the flip-flop 20 is also coupled to one input terminal of an AND gate 27. The other input to the AND gate 27 is derived from the output of a delay circuit 29. The input to the delay circuit 29 comprises a particular clock pulse $CP_1$. The "1" output terminals of the flip-flops 30 and 28 as well as clock pulses $CP_8$ and $CP_9$ (which respectively in order follow $CP_7$ and precede $CP_{10}$ in a train) are coupled to the input terminals of the AND gates 34 and 32, respectively. The outputs of the AND gates 32 and 34 are in turn individually coupled to the remaining input terminals of the OR gate 18.

The function of the flip-flops 28 and 30, the AND gates 27, 32 and 34, and the delay circuit 29, as will be described in more detail subsequently, is to count the number of "one" and "zero" groups contained in a word to be stored and record a group parity check bit depending on the count. The group parity system to be described records a binary "one" check bit in the storage medium 10 when the number of particular groups in the input data word is odd and records a binary "zero" when the number of particular groups is even. Other parity check systems could also be utilized. The OR gate 18 functions as a buffer in the write network 12.

The read network 14 of the storage system includes a reading head or magnetic transducer 40 which is coupled to detect the presence of magnetically polarized areas on the storage medium 10. A read amplifier 42, which may be of the type disclosed in the previously referenced article, is coupled to the read head 40 to amplify the playback signal generated in the head 40 by the rotation of the medium 10. A threshold level detector 44 is coupled to the read amplifier 42 and responds to pass only those bipolar peaks of the amplified playback signal which exceed a predetermined threshold level. The bipolar pulse output of the detector 44 is amplified in a pulse amplifier 46 and the pulses corresponding to a binary value of "one" are applied to the set input terminal S of a bistable flip-flop circuit 48, while the pulses corresponding to a binary value of "zero" are applied to the reset terminal R thereof.

The "1" output terminal of the flip-flop 48 is coupled to one of the input terminals of an AND gate 50. A train of clock pulses (CP) are applied to a second input terminal thereof. The third inhibition input terminal of the AND gate 50 is connected to the output of an OR gate 51 whose inputs are clock pulses $CP_8$, $CP_9$, $CP_{10}$, and $CP_1$. The output of the AND gate 50 is coupled to an output terminal 52 for the read network 14. The combination of the flip-flop 48, and AND gate 50, the OR gate 49 and the clock pulse train (CP) effectively convert the bipolar playback signal, which consists of pulses, each occupying one or more complete clock periods, into a unipolar output signal, which consists of pulses, each occupying a fraction of a clock period. The output signal is therefore made identical in binary form to the input signal. Thus there appears at the output terminal 52 a pulse of one polarity for a binary "one" stored in the storage medium 10 and the absence of any pulse for a binary "zero" stored in the medium 10, with no pulses appearing between the data words. The output data is delayed one bit-time with respect to the input data due to the nature of the recording and playback process.

An error detection circuit is included in the read network 14 and includes a pair of triggerable flip-flop counters 54 and 56. The "1" and "0" output terminals of the flip-flop 48 are coupled to the trigger input terminals T of the flip-flop counters 54 and 56 respectively. The clock pulse $CP_1$ is also applied to the reset terminals R of the flip-flops 54 and 56. The "0" output terminal of the flip-flop 48 is also coupled to one input terminal of an AND gate 55 and a clock pulse ($CP_2$) is applied to the other input terminal of the AND gate 55. The output terminal of the AND gate 55 is coupled to the set terminal S of the flip-flop 58.

An error sensing circuit which includes a plurality of AND gates 60, 62, 63 and 64 are provided to sense a group error in the playback signal. The "1" output terminals of the flip-flops 48 and 54 are coupled to two input terminals of the AND gate 60 while the clock pulse ($CP_{10}$) is applied to the remaining input of this gate. The "0" output terminal of the flip-flop 54 is coupled to one input terminal of the AND gate 62 while the clock pulse ($CP_{10}$) is applied to the second input of this gate. The inhibition input terminal of the AND gate 62 is coupled to the "1" output terminal of the flip-flop 48. The "1" output terminals of the flip-flops 48 and 56 are coupled to two input terminals of the AND gate 63 while the clock pulse ($CP_9$) is applied to the remaining input terminal of this gate. The "0" output terminal of the flip-flop 56 is coupled to one input terminal of the AND gate 64 while the clock pulse ($CP_9$) is applied to the second input terminal of this gate. The inhibition input terminal of the AND gate 64 is coupled to the "1" output terminal of the flip-flop 48. The output terminals of the AND gates 60, 62, 63, and 64 are coupled to an OR gate 68 from which there appears an output at an error terminal 70 only when an error in the playback signal is sensed. The error output of the OR gate 68 may be utilized to ring an alarm, activate an error correction circuit or the like.

Figure 2:
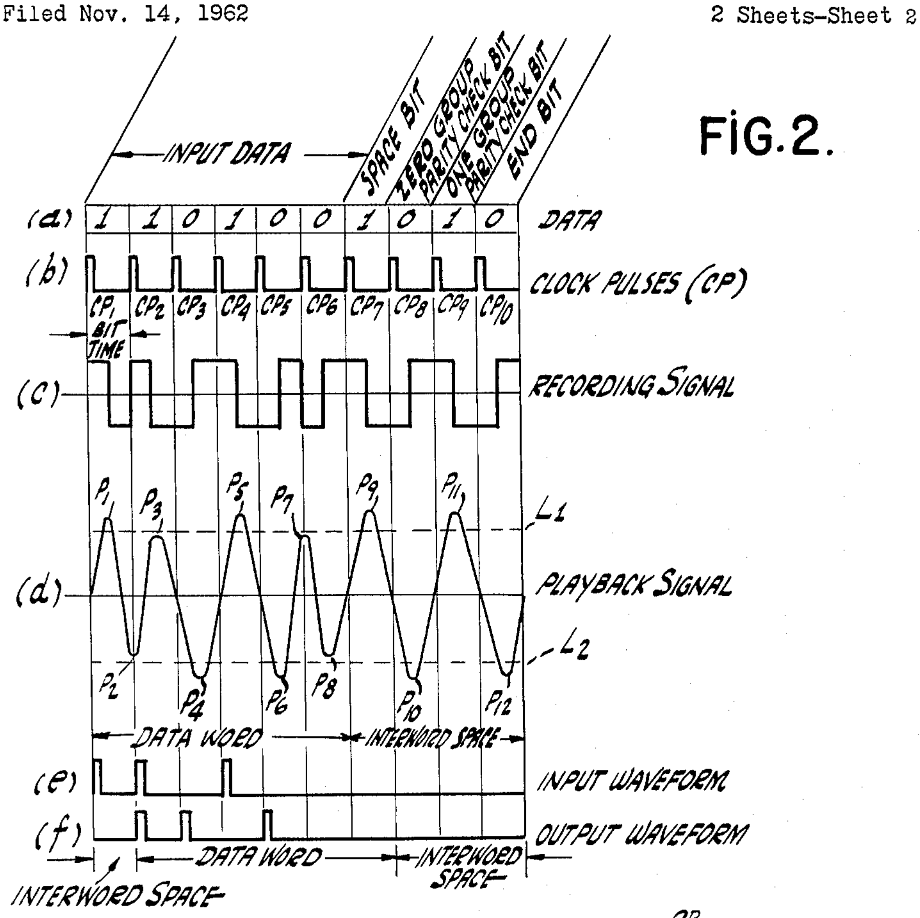
FIGURE 2 is a series of graphs depicting the waveforms (somewhat idealized) occurring at various locations in the storage system of FIGURE 1.

In describing the operation of the circuit of FIGURE 1, and for the purposes of illustration only, it will be assumed that the binary coded data to be stored in the storage medium 10 is of the form 1 1 0 1 0 0, as shown in the line "*a*" of FIGURE 2. The waveform of the input data, as shown in line "*e*" of FIGURE 2, is such that the presence of a pulse denotes a binary "one," the absence of a pulse denotes a binary "zero," and that there is an interval or interword space of no pulses before the next input data. The end bit clock pulse ($CP_{10}$), at the end of a previous word, would have reset the flip-flops 20, 28 and 30 in the write network 12 and the clock pulse ($CP_1$) resets the flip-flops 54 and 56 in the read network 14.

The first input pulse, representing a binary "one" is coupled through the OR gate 18 and sets the flip-flop 20, producing an output from the "1" terminal thereof. The write amplifier 24 responds to the output from the flip-flop 20 and to the clock pulses (CP) by producing a recording signal, as shown in line "*c*" of FIGURE 2, which comprises a pair of current pulses of opposite polarity. The storage medium 10 is therefore magnetically polarized, first in one direction and then in the opposite direction by the two recording pulses. Additionally, the leading edge of the output signal from the flip-flop 20, which is produced when switching from the reset to the set condition, triggers the flip-flop 28 to the set condition. However, the output pulse from the "1" terminal of the flip-flop 28 is not passed by the AND gate 32 since the gate 32 has not been enabled by the clock pulse ($CP_9$).

The second binary "one" input pulse does not change the flip-flop 20 from the set condition but the continuous output signal from the "1" terminal thereof causes the write amplifier 24 to produce a pair of recording pulses similar to the first pair. However, it is to be noted that the return of the recording signal to its previous polarity to record the second binary "one," line "*c*" of FIGURE 2, will effectively cause a reversal in the direction of polarization at the boundary between the first and the second bit cells in the storage medium. This reversal in polarization at the boundary of the bit cells is the origin of the undesired peaks produced in the playback signal in storage systems utilizing phase modulation recording.

The continuous output from the "1" terminal of the flip-flop 20 does not change the state of the flip-flop 28 from its previously set condition. Thus, the first two binary "one" input pulses are counted as the first "one" group by the flip-flop 28.

The third bit of the input data is a binary "zero" and is denoted by the absence of an input pulse. Since the AND gate 22 is enabled by the absence of an input pulse, the absence of the clock pulse ($CP_7$) and the presence of another clock pulse (in this instance clock pulse $CP_3$), the pulse output of the gate 22 resets the flip-flop 20. The output from the "0" terminal thereof causes the write amplifier 24 to record a binary "zero" by producing a recording signal having a phase relationship opposite to that produced when recording a binary "one." It is to be noted the first recording pulse of the binary "zero" is of the same polarity as the second recording pulse of a binary "one," as shown in line "*c*" of FIGURE 2. Therefore both merge into a recording pulse of one polarity. The flip-flop 20 in switching to its reset condition triggers the flip-flop circuit 30 to its set condition and thus the flip-flop 30 counts the first "zero" group in the input data. Since the AND gate 34 has not been enabled by the clock pulse ($CP_8$), the output of the flip-flop 30 is not passed by the gate 34. The purpose of the AND gate 27, delay circuit 29 and $CP_1$ is to count the first "zero" group in an input data word when the word begins with a "zero" group. If the word shown in FIGURE 2 began with a "zero" group, the flip-flop 20 would not be triggered from its initial reset condition and thus there would be no pulse to trigger the flip-flop 30 to its set condition in the absence of the clock pulse ($CP_1$). However with the clock pulse ($CP_1$) the flip-flop 30 is switched to its set condition when the flip-flop 20 is operating in its reset condition. Thus the flip-flop 30 counts an initial "zero" group in an input data word. The delay circuit 29 prevents the clock pulse $CP_1$ from setting the flip-flop 30 when an input data word begins with a "one" group. The delay circuit 29 introduces a delay in the clock pulse $CP_1$ that is sufficiently long to enable the initial "one" input data bit to set the flip-flop 20 and thus disable the AND gate 27 before the clock pulse ($CP_1$) completely traverses the delay circuit 29. It is, of course, apparent that the delay circuit 29 is not required when an additional train of delayed clock pulses (CP′) are available.

The fourth input data bit is recorded as a binary "one" and sets the flip-flop 20 while resetting the flip-flop 28. Thus the flip-flop 28 counts the fourth input data bit as the second "one" group in the input signal. The fifth and sixth input data bits reset the flip-flop 20 and are recorded in the medium 10 as binary "zeros." The flip-flop 30 is reset and thus counts the fifth and sixth input bits as the second "zero" group. Thus the flip-flops 28 and 30 by both being in the reset condition have counted two "zero" groups and two "one" groups.

The input data signal after the sixth bit is zero and, during this interval, the parity check bits are recorded in the storage medium 10. The first redundant bit recorded is a spacing bit which separates the input data from the check bits by recording a binary number in the storage medium 10 opposite in value to that of the last bit in the input data signal. The space bit clock pulse ($CP_7$) triggers the flip-flop 20 from its reset to its set condition. Thus a binary "one" is recorded in the storage medium 10. However the flip-flop 20 also triggers the counter 28 to its set condition and thus the space bit is also counted as a "one" group.

To record the "zero" group parity bit, the clock pulse ($CP_8$) is applied to the AND gate 34. Since the flip-flop 30 is in its reset condition, the AND gate 34 is disabled. However the enabling of the AND gate 22 causes a "zero" group parity check bit of binary value of "zero" to be recorded in the storage medium 10. This corresponds to a system of "even" parity checking and it is apparent that an "odd" system could just as readily be utilized.

To record the "one" group parity check bit, the clock pulse ($CP_9$) is applied to the AND gate 32. The gate 32 is enabled by the set condition of the flip-flop counter 28 and a binary "one" is recorded in the storage medium 10 indicating that an odd number of "one" groups exist in the previous data.

The end bit clock pulse ($CP_{10}$) resets all of the flip-flops in the write circuit 12 and is also recorded as a binary "zero" in the storage medium 10. This is the last bit recorded in the particular word illustrated in FIGURE 2.

The playback signal waveform appearing at the output terminals of the read amplifier 42 is shown in line "*d*" of FIGURE 2. It is to be noted that the magnitudes of some of the positive and negative peaks of this signal exceed the threshold levels $L_1$ and $L_2$ respectively. It is further to be noted that the larger peaks in the playback signal correspond to the first bit in a group of bits of the same binary value in the input data signal and thus the larger peaks effectively denote a transition from a group of bits of one binary value to a group of another binary value. This phenomenon is primarily due to a combination of effects produced during both the recording and reading processes. During recording, the longer pulse produced when the input data changes from a binary "one" to a binary "zero" and vice versa results in a greater intensity of polarization in the magnetic surface which is subject to the uninterrupted, same polarity magnetization. This is especially pronounced at high packing densities and at high recording speeds (with respect to the limitations imposed by material, geometry and circuits considerations). This phenomenon tends to produce a larger amplitude in the peak of the playback signal corresponding to this magnetization spot.

Additionally, and perhaps more importantly, the magnetic fields produced by the polarized bit cells fringe and tend to cancel each other. Therefore, during the reading process, these cancellations reduce the playback signal voltage. However, at the transitions between groups of different binary value, the polarized dipoles in the storage medium 10 are further apart and the greater distances involved tend to decrease the interference between the dipoles. Therefore the playback signal peaks corresponding to these transitions tend to be larger than the other peaks in the signal. In any event, the phenomenon does occur and is further intensified at high packing densities. It therefore is utilized to provide a simpler circuit for reading from the storage medium 10.

The playback signal is applied to the threshold level detector 44. The detector 44 may, for example, comprise a pair of diode circuits, each diode of which is poled to conduct on the application of a signal of a different polarity. Additionally, both diodes are biased to conduct only when the signal peaks exceed a predetermined magnitude, as denoted by the levels $L_1$ and $L_2$ in line "*d*" of FIGURE 2. Thus the detector 44 clips the larger peaks in the playback signal and produces a series of pulses of both positive and negative polarities. A positive polarity pulse effectively indicates the beginning of a group of bits of a binary value of "one" while a negative pulse indicates the beginning of a group of binary "zeros."

The first positive pulse $P_1$ in the playback signal exceeds the threshold level $L_1$, so it is detected by the detector 44. The pulse $P_1$ exceeds the level $L_1$ because it is the first bit in a "one" group which succeeds the "zero" end bit recorded in a previous word. The pulse $P_1$ is amplified in the pulse amplifier 46 and sets the flip-flop 48. The flip-flop 48, which was initially in the reset condition due to the clock pulse ($CP_{10}$) of a previous word, produces an output from the "1" terminal thereof. The coincidence of the "1" output from the flip-flop 48 and the clock pulse ($CP_2$) enables the AND gate 50 and produces a pulse of one polarity at the output terminal 52 of the read network 14. The pulse $P_1$ also triggers the flip-flop 54 to its set condition.

The detector 44 does not respond to the pulse $P_2$ in the playback signal because it does not reach the threshold level $L_2$. The pulse $P_2$ is an undesired pulse which, in prior art read circuits, could only be blocked by utilizing a carefully synchronized strobe signal. Similarly the detector 44 does not respond to the pulse $P_3$ which corresponds to a second binary "one" bit in the first "one" group. However, the clock pulse ($CP_3$) in conjunction with the "1" output of the flip-flop 48 causes a binary "one" pulse to appear at the output terminal 52.

The detector 44 does clip the negative pulse $P_4$ which after amplification and inversion resets the flip-flop 48. The absence of a "1" output from the flip-flop 48 disables the AND gate 50 and no pulse appears at the output terminal 52, which indicates a binary "zero" in the output signal.

Thus the flip-flop 48, and AND gate 50, and the train of clock pulses CP convert the bipolar pulse output from the detector 44 and pulse amplifier 46 into a unipolar binary form. In order not to obliterate the interword space in the output waveform with the generated redundant information (space bit and parity check bits), the AND gate 50 is disabled by clock pulses $CP_8$, $CP_9$, $CP_{10}$ and $CP_1$ which are coupled to its inhibit-input-terminal through OR gate 51.

The succession of detected positive and negative pulses in the playback signal alternately set and reset the flip-flop 48 producing binary "ones" and "zeros" in the output signal waveform, depicted in line "*f*" of FIGURE 2, thereby reproducing, after a delay of one bit-time (plus an arbitrary number of word times), the input data waveform. Thus the stored data in the storage medium is read by detecting the transitions between groups of bits of different binary value.

It is apparent that, in addition to the above described system of reading phase modulated signals, the signals may also be read by converting the double polarity output pulses from the detector 44 into pulses of a single polarity and recognizing that each pulse denotes a transition in binary value. Such a detection system may be utilized to recover the initial input data signal because the binary zero end bit represents a reference by which it is known that the first pulse detected comprises the transition to a "one" group. The next detected pulse then denotes a transition to a "zero" group and so forth.

In the detection methods described, the omission or erroneous detection of a transition would eliminate a whole group of bits and, depending on the number of bits in the group, might not be detectable by conventional bit parity checking. Thus, group parity checking is provided to decrease the possibility of undetected errors. The flip-flops 56 and 54 count the number of "zero" and "one" groups respectively. At the time of the clock pulse ($CP_9$), which follows the "zero" group parity check bit, the "zero" group counter 56 is in the set condition having been set by the playback signal pulse $P_4$, reset by the pulse $P_6$, and then set again by the pulse $P_{10}$. Under these circumstances, the AND gates 63 and 64 are disabled and the clock pulse ($CP_9$) cannot produce an error signal at the output of the OR gate 68. The AND gate 64 is disabled because the flip-flop 56 is set while the AND gate 63 is disabled because the flip-flop 48 is reset. Had there been an extraneous or missing "zero" group in the playback signal, an eror pulse would be produced during the sampling time of clock pulse ($CP_9$). The AND gate 55 and clock pulse ($CP_2$) sets the flip-flop 56 when the playback signal begins with a "zero" group. Similarly, the "one" group parity is checked by the flip-flop 54 and clock pulse ($CP_{10}$). The flip-flops 54 and 48 are in the reset and set conditions respectively at the time the clock pulse ($CP_{10}$) is applied to the AND gates 60 and 62. Thus both gates 60 and 62 are disabled and no error signal is produced.

Both "one" and "zero" group parity check bits are required because if the first group in the playback signal, whether "one" or "zero," is read erroneously, the error cannot be detected by the group parity bit of the opposite polarity. Similarly, an error in the last group of the input data word could absorb the following group parity check bits and result in an undetected error, unless a space bit of a polarity opposite to that of the last group of the data word is present. If any intermediate group is erroneously read, both parity bits will detect the error. Thus an error is detected by either one or both group-parity check bits.

Figure 3:
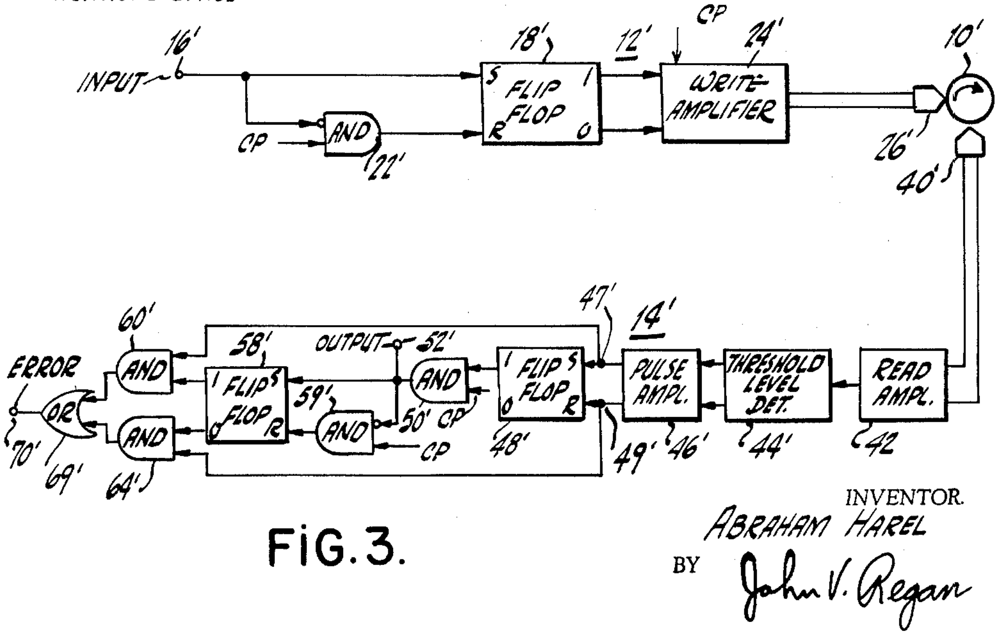
FIGURE 3 is a schematic block diagram of another embodiment of the invention.

Referring now to FIGURE 3, there is illustrated another embodiment of the invention which checks the proper functioning of the system and thereby detects group errors in the playback signal. This embodiment does not require the addition of redundant group parity check bits to the recording signal so consequently saves space in the storage medium. In the circuit of FIGURE 3, components identical to those in FIGURE 1 have been given similar reference numerals. An input data signal, as shown in FIGURE 2, is applied to an input terminal 16' of a write circuit 12'. The input terminal 16' is coupled to the set terminals of a flip-flop 18' as well as to an inhibit terminal of an AND gate 22'. Successive trains of clock pulses (CP) are applied to the other input of the AND gate 22'. The output of the AND gate 22' is coupled to the reset terminal R of the flip-flop 18'. The "1" and "0" output terminals of the flip-flop 18' are coupled to a write amplifier 24', similar to the write amplifier 24 in FIGURE 1. The recording signal produced by the write amplifier 24' is applied to a transducer 26' coupled to record the phase modulated recording signal in the polarizable storage medium 10'. The write circuit 12' records the input data signal without adding group parity checking bits. Thus the operation of the write circuit 12' is identical to the write circuit 12 of FIGURE 1 prior to the generation of the space and group parity check bits.

It is, of course, apparent that in particular types of write amplifiers 24', the flip-flop 18' and the AND gate 22' are not required to convert the unipolar input signal into a bipolar signal because the amplifiers are capable of responding to unipolar input signals by producing phase modulated recording signals.

A read circuit 14' includes a transducer 40' for generating a playback signal from the storage medium 10', and a read amplifier 42' for amplifying the playback signal. A threshold level detector 44' detects the positive and negative polarity pulses above the threshold level $L_1$ and $L_2$, as shown in FIGURE 2, and a pulse amplifier 46' amplifies these pulses. The pulses corresponding to a binary value of "one" are applied from the terminal 47' of the amplifier 46' to the set terminal S of a flip-flop 48' while the pulses corresponding to a binary value "zero" are applied from the terminal 49' to the reset terminal R thereof. The 1 output terminal of the flip-flop 48' as well as successive trains of clock pulses (CP) are applied to the input terminals of an AND gate 50'. The portion of the read circuit 14' described above reproduces the input data signal in a manner similar to that described for the read circuit 14 of FIGURE 1.

To detect the omission or erroneous addition of a transition pulse, in the playback signal, an error detection network is included in the read circuit 14'. The output of the AND gate 50' is applied to the set terminal S of a flip-flop 58' and also to an inhibit terminal of an AND gate 59'. Successive trains of clock pulses (CP) are also applied to the other input terminal of the AND gate 59', while the output thereof is coupled to the reset terminal R of the flip-flop 58'. The 1 output terminal of the flip-flop 58' is coupled to an AND gate 60' while the 0 output terminal thereof is coupled to an AND gate 64'. Additionally, the pulses corresponding to a binary value of "one" from the terminal 47' of the amplifier 46' are applied to the second input terminal of the AND gate 60' while the pulses corresponding to a binary value of "zero" are applied from the terminal 49' of the amplifier 46' to the second input terminal of the AND gate 64'. The output of the AND gates 60' and 64' are coupled through an OR gate 69' to an error detecting terminal 70'. Error detecting is provided in the read circuit 14' due to the fact that a positive pulse in the playback signal, such as $P_1$ in line "*d*" of FIGURE 2, will set the flip-flop 58' which is initially in the reset condition. The flip-flop 58' is then reset by the negative pulse $P_4$. Thus at the time the next positive pulse $P_5$ appears at the terminal 47' the flip-flop is in the reset condition and the AND gate 60' is disabled. Thus there will be no output from the AND gate 60' and no error detection signal from the terminal 70'. However if the negative pulse $P_4$ had not been detected, the AND gate 60' would be enabled and an error would be detected.

In addition to the error detection systems described, conventional error detection by bit parity checking may also be included in the storage systems described by coupling a serial parity detector to output 52. A simple logic scheme designed to detect an erroneous space bit may also be included. Furthermore the error detection systems described may also be utilized with other group detection systems, such as with NRZ (non-return-to-zero) type signals.

Thus, an improved data storage system utilizing phase modulated recording signals is provided. The system permits the accurate reading of such signals without utilizing synchronized strobing signals. The system also permits the storage medium to be packed very densely and operated at high speed to provide the necessary large magnitude in the peaks in the playback signal occurring at the transition between groups of bits of different binary value. For example, on a magnetic drum which could normally store approximately 200 bits per inch, a storage system in accordance with the invention increases the storage density significantly. The system is further provided with an error detection system to insure that the omission or addition of a group of bits is detected.

What is claimed is:

1. An electrical circuit,
comprising in combination,
a polarizable storage medium having phase modulated signals stored therein by a change in polarization of said medium from a first direction to a second direction for an information signal of one value and a change in polarization from said second direction to said first direction for an information signal of another value,
means coupled to said storage medium for generating a playback signal having peaks of opposite polarity corresponding to said changes in polarization of said medium,
said playback signal exhibiting a greater magnitude at peaks corresponding to the first signal of any groups of stored information signals of the same value and a lesser magnitude at peaks corresponding to the other signals in said groups, and
means coupled to said generating means for detecting only said peaks of greater magnitude.

2. An electrical circuit,
comprising in combination,
a polarizable storage medium having binary coded phase modulated signals stored therein by a change in polarization of said medium from a first direction to a second direction for an information bit of one binary value and a change in polarization from said second direction to said first direction for an information bit of another binary value,
means coupled to said storage medium for generating a playback signal having peaks of opposite polarity corresponding to said changes in polarization of said medium,
said playback signal exhibiting a greater magnitude at peaks corresponding to the first bit of any group of stored information bits of the same binary value and a lesser magnitude at peaks corresponding to the other bits in said group, and
a threshold detector for separating said peaks of greater magnitude from said peaks of lesser magnitude.

3. An electrical circuit,
comprising in combination,
a polarizable storage medium having binary coded phase modulated signals stored therein by a change in polarization of said medium from a first direction to a second direction for an information bit of one binary value and a change in polarization from said second direction to said first direction for an information bit of another binary value,
means coupled to said storage medium for generating a playback signal having peaks of opposite polarity corresponding to said changes in polarization of said medium,
said playback signal exhibiting a greater magnitude at peaks corresponding to the first bit of any group of stored information bits of the same binary value and a lesser magnitude at peaks corresponding to the other bits in said group,
detection means coupled to said generating means for detecting only said peaks of greater magnitude, and
bistable circuit means coupled to said detection means for converting said peaks of greater magnitude into binary form.

4. An electrical circuit,
comprising in combination,
a polarizable storage medium having binary coded phase modulated signals stored therein by a change in polarization of said medium from a first direction to a second direction for an information bit of one binary value and a change in polarization from said second direction to said first direction for an information bit of another binary value,
means coupled to said storage medium for generating a playback signal having peaks of opposite polarity corresponding to said changes in polarization of said medium,
said playback signal exhibiting a greater magnitude at peaks corresponding to the first bit of any group of stored information bits of the same binary value and a lesser magnitude at peaks corresponding to the other bits in said group,
threshold detection means coupled to said generating means for detecting only said peaks of greater amplitude,
bistable circuit means coupled to said detection means for converting said peaks of greater magnitude into amplitude modulated binary form, and
error detection means for sensing the omission or extraneous addition of the detection of a peak of greater magnitude.

5. An electrical circuit,
comprising in combination,
a polarizable storage medium having binary coded phase modulated signals stored therein by a change in polarization of said medium from a first direction to a second direction for an information bit of one binary value and a change in polarization from said second direction to said first direction for an information bit of another binary value,
means coupled to said storage medium for generating a playback signal having peaks of opposite polarity corresponding to said changes in polarization of said medium,
said playback signal exhibiting a greater magnitude at peaks corresponding to the first bit of any group of stored information bits of the same binary value and a lesser magnitude at peaks corresponding to the other bits in said group,
a threshold detector coupled to said generating means for detecting only said peaks of greater magnitude,
a pulse amplifier coupled to said detector for amplifying said peaks of greater magnitude,
bistable circuit means coupled to said pulse amplifier for converting said amplified peaks into binary form, and
error detection means coupled to said bistable circuit means for sensing the omission or extraneous addition of the detection of a peak of said greater magnitude.

6. An electrical circuit,
comprising in combination,
a polarizable storage medium having binary coded phase modulated signals stored therein by a change in polarization of said medium from a first direction to a second direction for an information bit of one binary value and a change in polarization from said second direction to said first direction for an information bit of another binary value,
means coupled to said storage medium for generating a playback signal having peaks of opposite polarity corresponding to said changes in polarization of said medium,
said playback signal exhibiting a greater magnitude at peaks corresponding to the first bit of any group of stored information bits of the same binary value and a lesser magnitude at peaks corresponding to the other bits in said group,
threshold detection means coupled to said generating means for separating said peaks of greater magnitude from said peaks of lesser magnitude to detect the transition between groups of bits of different values, and
means including a bistable circuit coupled to said detection means for converting said detected peaks into binary form by producing an output of one level for a detected peak of one polarity and an output of a second level for a detected peak of the opposite polarity.

7. An error check circuit for preventing errors in a binary coded signal having groups of information bits corresponding to one binary value and other groups of information bits corresponding to another binary value,
comprising in combination,
means for detecting the transitions between the groups of information bits of said one and another binary values in said binary coded signal, and
means for adding to said binary coded signal a pair of parity check bits, one for each of said signal groups to correspond, respectively, to said groups.

8. An error check circuit for preventing errors in a binary coded signal having groups of information bits corresponding to one binary value and other groups of information bits corresponding to another binary value,
comprising in combination,
means for detecting the transitions between the groups of information bits of said one and another binary value in said binary coded signal,
means for counting the number of groups in said binary coded signal corresponding, respectively, to said one and another binary value, and
means for adding to said binary coded signal a pair of parity check bits, one for each of said signal groups to correspond, respectively, to the counts of said groups.

9. An error check circuit for preventing errors in a binary coded signal having groups of information bits corresponding to one binary value and other groups of information bits corresponding to another binary value,
comprising in combination,
means for counting the number of groups in said binary coded signal corresponding, respectively, to said one and another binary values,
means for adding to said binary coded signal a pair of parity check bits, one for each of said signal groups, to correspond, respectively, to the counts of said groups,
a storage medium,
means for recording said binary coded signal and said parity check bits in said storage medium,
means for generating from said storage medium a playback signal corresponding to said recorded signal,
means for detecting the peaks in said playback signal corresponding to the first information bit of any group of information bits of the same binary value, means for counting said peaks to count the number of signal groups in said playback signal, and means for comparing said counts to said parity check bits.

References Cited by the Examiner

UNITED STATES PATENTS

| | | | |
|---|---|---|---|
| 2,907,004 | 9/1959 | Kun Li Chien et al. | 235—167 |
| 2,929,049 | 3/1960 | Lubkin | 340—146.1 X |
| 2,981,937 | 4/1961 | Hoberg | 340—146.1 |
| 2,997,704 | 8/1961 | Gordon et al. | 340—347 |
| 3,056,950 | 10/1962 | Birmingham et al. | 340—146.1 X |
| 3,078,448 | 2/1963 | O'Brien | 340—146.1 X |
| 3,114,130 | 12/1963 | Abramson | 340—146.1 |

MALCOLM A. MORRISON, *Primary Examiner.*

ROBERT C. BAILEY, *Examiner.*

M. A. LERNER, M. P. ALLEN, I. J. FAIBISCH, *Assistant Examiners.*